United States Patent
Wenger et al.

(10) Patent No.: US 11,072,321 B2
(45) Date of Patent: Jul. 27, 2021

(54) SYSTEMS AND METHODS FOR SMART LOAD SHEDDING OF A TRANSPORT VEHICLE WHILE IN TRANSIT

(71) Applicant: THERMO KING CORPORATION, Minneapolis, MN (US)

(72) Inventors: Scott Wenger, Mooresville, NC (US); Katherine Holmstrom, Norfolk, VA (US)

(73) Assignee: Thermo King Corporation, Minneapolis, MN (US)

( * ) Notice: Subject to any disclaimer, the term of this patent is extended or adjusted under 35 U.S.C. 154(b) by 8 days.

(21) Appl. No.: 16/236,938

(22) Filed: Dec. 31, 2018

(65) Prior Publication Data
US 2020/0207326 A1     Jul. 2, 2020

(51) Int. Cl.
*B60W 10/30*     (2006.01)
*B60W 20/11*     (2016.01)
(Continued)

(52) U.S. Cl.
CPC .......... *B60W 10/30* (2013.01); *B60H 1/00735* (2013.01); *B60W 20/11* (2016.01); *B60W 20/12* (2016.01); *B60W 20/13* (2016.01)

(58) Field of Classification Search
CPC ...... B60W 10/30; B60W 20/11; B60W 20/13; B60W 20/12; B60H 1/00735
See application file for complete search history.

(56) References Cited

U.S. PATENT DOCUMENTS

| | | |
|---|---|---|
| 3,875,483 A | 4/1975 | Farr |
| 5,104,037 A | 4/1992 | Karg et al. |

(Continued)

FOREIGN PATENT DOCUMENTS

| | | |
|---|---|---|
| CN | 2456117 | 10/2001 |
| CN | 1885660 | 12/2006 |

(Continued)

OTHER PUBLICATIONS

Yang et al., "The Role of Thermal Plume in Person-to-Person Contaminant Cross Transmission", 2017 Winter Conference, Seminar 36; Modeling and Control of the Personal Microenvironment, 5 pages.

(Continued)

*Primary Examiner* — Behrang Badii
*Assistant Examiner* — Daniel L Greene
(74) *Attorney, Agent, or Firm* — Hamre, Schumann, Mueller & Larson, P.C.

(57) ABSTRACT

Systems and methods for providing load shedding in a vehicle are provided. Particularly, the vehicle may be an electric vehicle and the loads that are shed may be HVAC or refrigeration loads. The load shedding methods and systems may include a predictive model of energy consumption, determining a predicted energy consumption and comparing it to a stored energy at the vehicle. If the predicted energy consumption exceeds the stored energy, load shedding operations may be performed at a transport climate control system, such as adjusting a set point, adjusting an operating mode of the transport climate control system, increasing a dead band of a compressor of the transport climate control system, utilizing free cooling such as ambient air to provide climate control in the vehicle, or increasing cooling provided by the transport climate control system to an energy storage of the vehicle.

20 Claims, 5 Drawing Sheets

(51) Int. Cl.
  *B60W 20/12* (2016.01)
  *B60W 20/13* (2016.01)
  *B60H 1/00* (2006.01)

(56) References Cited

U.S. PATENT DOCUMENTS

| | | |
|---|---|---|
| 6,280,320 B1 | 8/2001 | Paschke et al. |
| 6,487,869 B1 | 12/2002 | Sulc et al. |
| 6,518,727 B2 | 2/2003 | Oomura et al. |
| 6,560,980 B2 | 5/2003 | Gustafson et al. |
| 6,600,237 B1 | 7/2003 | Meissner |
| 6,631,080 B2 | 10/2003 | Trimble et al. |
| 6,652,330 B1 * | 11/2003 | Wasilewski ........... H02J 7/0031 440/1 |
| 6,688,125 B2 | 2/2004 | Okamoto et al. |
| 6,753,692 B2 | 6/2004 | Toyomura et al. |
| 7,011,902 B2 | 3/2006 | Pearson |
| 7,120,539 B2 | 10/2006 | Krull et al. |
| 7,122,923 B2 | 10/2006 | Lafontaine et al. |
| 7,151,326 B2 | 12/2006 | Jordan |
| 7,176,658 B2 | 2/2007 | Quazi et al. |
| 7,206,692 B2 | 4/2007 | Beesley et al. |
| 7,327,123 B2 | 2/2008 | Faberman et al. |
| 7,424,343 B2 | 9/2008 | Kates |
| 7,449,798 B2 | 11/2008 | Suzuki et al. |
| 7,532,960 B2 | 5/2009 | Kumar |
| 7,728,546 B2 | 6/2010 | Tanaka et al. |
| 7,730,981 B2 | 6/2010 | McCabe et al. |
| 7,745,953 B2 | 6/2010 | Puccetti et al. |
| 7,806,796 B2 | 10/2010 | Zhu |
| 7,830,117 B2 | 11/2010 | Ambrosio et al. |
| 7,898,111 B1 | 3/2011 | Pistel |
| 7,900,462 B2 | 3/2011 | Hegar et al. |
| 8,020,651 B2 | 9/2011 | Zillmer et al. |
| 8,030,880 B2 | 10/2011 | Alston et al. |
| 8,134,339 B2 * | 3/2012 | Burlak ................ H02H 3/12 320/134 |
| 8,170,886 B2 | 5/2012 | Luff |
| 8,214,141 B2 | 7/2012 | Froeberg |
| 8,295,950 B1 | 10/2012 | Wordsworth et al. |
| 8,381,540 B2 | 2/2013 | Alston |
| 8,441,228 B2 | 5/2013 | Brabee |
| 8,476,872 B2 | 7/2013 | Truckenbrod et al. |
| 8,487,458 B2 | 7/2013 | Steele et al. |
| 8,541,905 B2 | 9/2013 | Brabee |
| 8,602,141 B2 | 12/2013 | Yee et al. |
| 8,626,367 B2 | 1/2014 | Krueger et al. |
| 8,626,419 B2 | 1/2014 | Mitchell et al. |
| 8,643,216 B2 | 2/2014 | Lattin |
| 8,643,217 B2 | 2/2014 | Gietzold et al. |
| 8,670,225 B2 | 3/2014 | Nunes |
| 8,723,344 B1 | 5/2014 | Dierickx |
| 8,760,115 B2 | 6/2014 | Kinser et al. |
| 8,764,469 B2 | 7/2014 | Lamb |
| 8,818,588 B2 | 8/2014 | Ambrosio et al. |
| 8,862,356 B2 | 10/2014 | Miller |
| 8,912,683 B2 * | 12/2014 | Dames .................. H02J 7/02 307/38 |
| 8,924,057 B2 | 12/2014 | Kinser et al. |
| 8,978,798 B2 | 5/2015 | Dalum et al. |
| 9,030,336 B2 | 5/2015 | Doyle |
| 9,061,680 B2 | 6/2015 | Dalum |
| 9,093,788 B2 | 7/2015 | Lamb |
| 9,102,241 B2 | 8/2015 | Brabee |
| 9,147,335 B2 | 9/2015 | Raghunathan et al. |
| 9,199,543 B2 | 12/2015 | Brabee |
| 9,313,616 B2 | 4/2016 | Mitchell et al. |
| 9,436,853 B1 | 9/2016 | Meyers |
| 9,440,507 B2 | 9/2016 | Giovanardi et al. |
| 9,463,681 B2 | 10/2016 | Olaleye et al. |
| 9,464,839 B2 | 10/2016 | Rusignuolo et al. |
| 9,557,100 B2 | 1/2017 | Chopko et al. |
| 9,562,715 B2 | 2/2017 | Kandasamy |
| 9,694,697 B2 | 7/2017 | Brabee |
| 9,738,160 B2 | 8/2017 | Bae et al. |
| 9,758,013 B2 | 9/2017 | Steele |
| 9,783,024 B2 | 10/2017 | Connell et al. |
| 9,784,780 B2 | 10/2017 | Loftus et al. |
| 9,825,549 B2 | 11/2017 | Choi et al. |
| 9,846,086 B1 | 12/2017 | Robinson et al. |
| 9,893,545 B2 | 2/2018 | Bean |
| 9,931,960 B2 | 4/2018 | Tabatowski-Bush et al. |
| 9,975,403 B2 | 5/2018 | Rusignuolo et al. |
| 9,975,446 B2 | 5/2018 | Weber et al. |
| 9,987,906 B2 | 6/2018 | Kennedy |
| 10,000,122 B2 | 6/2018 | Wu et al. |
| 10,148,212 B2 | 12/2018 | Schumacher et al. |
| 10,240,847 B1 | 3/2019 | Thomas, Jr. |
| 2001/0025349 A1 * | 9/2001 | Sharood ............ H02J 13/0075 713/340 |
| 2002/0113576 A1 | 8/2002 | Oomura et al. |
| 2003/0043607 A1 | 3/2003 | Vinciarelli et al. |
| 2003/0106332 A1 | 6/2003 | Okamoto et al. |
| 2003/0200017 A1 | 10/2003 | Capps et al. |
| 2005/0057210 A1 | 3/2005 | Ueda et al. |
| 2005/0065684 A1 * | 3/2005 | Larson .................... B60R 16/03 701/36 |
| 2005/0285445 A1 * | 12/2005 | Wruck ...................... H02J 1/14 307/10.1 |
| 2006/0284601 A1 | 12/2006 | Salasoo et al. |
| 2007/0052241 A1 | 3/2007 | Pacy |
| 2007/0131408 A1 | 6/2007 | Zeigler et al. |
| 2007/0192116 A1 | 8/2007 | Levitt |
| 2008/0023965 A1 | 1/2008 | Cagliari et al. |
| 2008/0177678 A1 * | 7/2008 | Di Martini ............. G06Q 50/06 705/412 |
| 2008/0281473 A1 * | 11/2008 | Pitt ....................... G06Q 50/06 700/291 |
| 2009/0121798 A1 | 5/2009 | Levinson |
| 2009/0126901 A1 | 5/2009 | Hegar et al. |
| 2009/0178424 A1 | 7/2009 | Hwang et al. |
| 2009/0195349 A1 | 8/2009 | Frader-Thompson et al. |
| 2009/0229288 A1 | 9/2009 | Alston et al. |
| 2009/0314019 A1 | 12/2009 | Fujimoto et al. |
| 2009/0320515 A1 | 12/2009 | Bischofberger et al. |
| 2010/0230224 A1 | 9/2010 | Hindman |
| 2010/0312425 A1 | 12/2010 | Obayashi et al. |
| 2010/0320018 A1 | 12/2010 | Gwozdek et al. |
| 2011/0000244 A1 | 1/2011 | Reason et al. |
| 2011/0114398 A1 | 5/2011 | Bianco |
| 2011/0208378 A1 | 8/2011 | Krueger et al. |
| 2011/0224841 A1 | 9/2011 | Profitt-Brown et al. |
| 2011/0241420 A1 | 10/2011 | Hering et al. |
| 2011/0290893 A1 * | 12/2011 | Steinberg ................. F24F 11/30 236/49.3 |
| 2012/0000212 A1 | 1/2012 | Sanders et al. |
| 2012/0116931 A1 | 5/2012 | Meyers |
| 2012/0198866 A1 | 8/2012 | Zeidner |
| 2012/0310416 A1 | 12/2012 | Tepper et al. |
| 2013/0000342 A1 | 1/2013 | Blasko et al. |
| 2013/0088900 A1 | 4/2013 | Park |
| 2013/0158828 A1 | 6/2013 | McAlister |
| 2013/0231808 A1 | 9/2013 | Flath et al. |
| 2014/0018969 A1 * | 1/2014 | Forbes, Jr. ............... H02J 3/386 700/295 |
| 2014/0026599 A1 | 1/2014 | Rusignuolo et al. |
| 2014/0060097 A1 | 3/2014 | Perreault |
| 2014/0230470 A1 | 8/2014 | Cook |
| 2014/0265560 A1 | 9/2014 | Leehey et al. |
| 2015/0081212 A1 | 3/2015 | Mitchell et al. |
| 2015/0188360 A1 | 7/2015 | Doane et al. |
| 2015/0231948 A1 | 8/2015 | Kennedy |
| 2015/0246593 A1 | 9/2015 | Larson et al. |
| 2015/0355288 A1 | 12/2015 | Yokoyama et al. |
| 2015/0360568 A1 | 12/2015 | Champagne et al. |
| 2016/0011001 A1 | 1/2016 | Emory et al. |
| 2016/0035152 A1 | 2/2016 | Kargupta |
| 2016/0089994 A1 * | 3/2016 | Keller ............... H02J 7/007194 320/153 |
| 2016/0280040 A1 | 9/2016 | Connell et al. |
| 2016/0285416 A1 | 9/2016 | Tiwari et al. |
| 2016/0291622 A1 * | 10/2016 | Al-Mohssen ............ G05F 1/66 |
| 2016/0327921 A1 * | 11/2016 | Ribbich ................. F24F 11/30 |

(56) References Cited

U.S. PATENT DOCUMENTS

| | | |
|---|---|---|
| 2016/0377309 A1 | 12/2016 | Abiprojo et al. |
| 2017/0030728 A1 | 2/2017 | Baglino et al. |
| 2017/0057323 A1 | 3/2017 | Neu et al. |
| 2017/0063248 A1 | 3/2017 | Lee et al. |
| 2017/0098954 A1 | 4/2017 | Ferguson et al. |
| 2017/0217280 A1 | 8/2017 | Larson et al. |
| 2017/0259764 A1 | 9/2017 | Da Silva Carvalho et al. |
| 2017/0302200 A1 | 10/2017 | Marcinkiewicz |
| 2017/0349078 A1 | 12/2017 | Dziuba et al. |
| 2018/0029436 A1 | 2/2018 | Zaeri et al. |
| 2018/0029488 A1 | 2/2018 | Sjödin |
| 2018/0111441 A1 | 4/2018 | Menard et al. |
| 2018/0154723 A1 | 6/2018 | Anderson et al. |
| 2018/0170398 A1 | 6/2018 | Miller et al. |
| 2018/0201092 A1 | 7/2018 | Ahuja et al. |
| 2018/0203443 A1 | 7/2018 | Newman |
| 2018/0222278 A1 | 8/2018 | Mizuma |
| 2018/0342876 A1 | 11/2018 | Agnew et al. |
| 2018/0342877 A1 | 11/2018 | Yoo et al. |
| 2018/0356870 A1 | 12/2018 | Rusignuolo |
| 2019/0086138 A1 | 3/2019 | Chopko et al. |
| 2019/0092122 A1 | 3/2019 | Vanous et al. |
| 2019/0123544 A1 | 4/2019 | Pelegris et al. |
| 2019/0184838 A1 | 6/2019 | Lee et al. |
| 2019/0255914 A1 | 8/2019 | Ikeda et al. |
| 2019/0283541 A1 | 9/2019 | Adetola et al. |
| 2020/0050753 A1* | 2/2020 | Davis .................. G06F 21/6218 |
| 2020/0086712 A1* | 3/2020 | Schumacher ......... B60R 16/033 |
| 2020/0086744 A1 | 3/2020 | Schumacher et al. |
| 2020/0101820 A1 | 4/2020 | Wenger et al. |

FOREIGN PATENT DOCUMENTS

| | | |
|---|---|---|
| CN | 2912069 | 6/2007 |
| CN | 101713577 | 5/2010 |
| CN | 202038315 | 11/2011 |
| CN | 104539184 | 4/2015 |
| CN | 104734178 | 6/2015 |
| CN | 105711376 | 6/2016 |
| CN | 106184252 | 12/2016 |
| CN | 106766419 | 5/2017 |
| CN | 106774131 | 5/2017 |
| CN | 108074466 | 5/2018 |
| CN | 108931006 | 12/2018 |
| CN | 208306320 | 1/2019 |
| CN | 208650989 | 3/2019 |
| DE | 3817365 | 11/1989 |
| DE | 29715576 | 12/1997 |
| DE | 10138750 | 2/2003 |
| DE | 10200637 | 10/2003 |
| DE | 102011050719 | 12/2012 |
| EP | 0282051 | 9/1988 |
| EP | 1935712 | 6/2008 |
| EP | 2365915 | 9/2011 |
| EP | 2689944 | 1/2014 |
| EP | 2717016 | 9/2014 |
| EP | 3343728 | 7/2018 |
| EP | 536552 | 9/2019 |
| EP | 3540340 | 9/2019 |
| GB | 2551999 | 1/2018 |
| JP | 2000158930 | 6/2000 |
| JP | 2007320352 | 12/2007 |
| JP | 2009243780 | 10/2009 |
| JP | 2019145521 | 8/2019 |
| KR | 10-2012-0092834 | 8/2012 |
| WO | 03038988 | 5/2003 |
| WO | 2010065476 | 6/2010 |
| WO | 2011066468 | 6/2011 |
| WO | 2012138497 | 10/2012 |
| WO | 2013096084 | 6/2013 |
| WO | 2014002244 | 1/2014 |
| WO | 2014058610 | 4/2014 |
| WO | 2014085672 | 6/2014 |
| WO | 2014106060 | 7/2014 |
| WO | 2014106068 | 7/2014 |
| WO | 2016145107 | 9/2016 |
| WO | 2017058660 | 4/2017 |
| WO | 2017172484 | 10/2017 |
| WO | 2017172855 | 10/2017 |
| WO | 2017176682 | 10/2017 |
| WO | 2017176725 | 10/2017 |
| WO | 2017176729 | 10/2017 |
| WO | 2017189485 | 11/2017 |
| WO | 2017218909 | 12/2017 |
| WO | 2017218910 | 12/2017 |
| WO | 2017218912 | 12/2017 |
| WO | 2018005957 | 1/2018 |
| WO | 2018009646 | 1/2018 |
| WO | 2018009798 | 1/2018 |
| WO | 2018017818 | 1/2018 |
| WO | 2018029502 | 2/2018 |
| WO | 2018204591 | 11/2018 |
| WO | 2018226389 | 12/2018 |
| WO | 2018226649 | 12/2018 |
| WO | 2018226848 | 12/2018 |
| WO | 2018226857 | 12/2018 |
| WO | 2018226862 | 12/2018 |
| WO | 2018226906 | 12/2018 |
| WO | 2018226981 | 12/2018 |
| WO | 2018226986 | 12/2018 |
| WO | 2019051086 | 3/2019 |
| WO | 2019151947 | 8/2019 |
| WO | 2020068446 | 4/2020 |
| WO | 2020068450 | 4/2020 |
| WO | 2020068469 | 4/2020 |
| WO | 2020068475 | 4/2020 |
| WO | 2020068502 | 4/2020 |
| WO | 2020068556 | 4/2020 |
| WO | 2020068641 | 4/2020 |
| WO | 2020068646 | 4/2020 |
| WO | 2020069107 | 4/2020 |

OTHER PUBLICATIONS

"Lamberet Smart Reefer on Solutrans", ZOEKEN, Jul. 28, 2015, 7 pages, available at: https://iepieleaks.nl/lamberet-smart-reefer-solutrans/.

U.S. Appl. No. 16/178,067, titled "Methods and Systems for Generation and Utilization of Supplemental Stored Energy for Use in Transport Climate Control", filed Nov. 1, 2018, 35 pages.

U.S. Appl. No. 16/565,063, titled "System and Method for Managing Power and Efficiently Sourcing a Variable Voltage for a Transport Climate Control System", filed Sep. 9, 2019, 59 pages.

U.S. Appl. No. 16/574,754, titled "Methods and Systems for Energy Management of a Transport Climate Control System", filed Sep. 18, 2019, 50 pages.

U.S. Appl. No. 16/574,775, titled "Methods and Systems for Power and Load Management of a Transport Climate Control System", filed Sep. 18, 2019, 68 pages.

European Patent Application No. 18382672.6, titled "Methods and Systems for Energy Management of a Transport Climate Control System", filed Sep. 19, 2018, 50 pages.

European Patent Application No. 18382673.4 titled "Methods and Systems for Power and Load Management of a Transport Climate Control System", filed Sep. 19, 2018, 68 pages.

U.S. Appl. No. 16/176,802, titled "Methods and Systems for Controlling a Mild Hybrid System That Powers a Transport Climate Control System", filed Oct. 31, 2018, 31 pages.

U.S. Appl. No. 16/176,720, titled "Methods and Systems for Augmenting a Vehicle Powered Transport Climate Control System", filed Oct. 31, 2018, 33 pages.

U.S. Appl. No. 16/176,667, titled "Drive Off Protection System and Method for Preventing Drive Off", filed Oct. 31, 2018, 41 pages.

U.S. Appl. No. 16/176,602, titled "Reconfigurable Utility Power Input With Passive Voltage Booster", filed Oct. 31, 2018, 39 pages.

U.S. Appl. No. 16/147,704, titled "Methods and Systems for Monitoring and Displaying Energy Use and Energy Cost of a Transport Vehicle Climate Control System or a Fleet of Transport Vehicle Climate Control Systems", filed Sep. 29, 2018, 33 pages.

(56) References Cited

OTHER PUBLICATIONS

U.S. Appl. No. 16/235,865, titled "Methods and Systems for Preserving Autonomous Operation of a Transport Climate Control System", filed Dec. 28, 2018, 41 pages.
PCT International Application No. PCT/US2018/068136, titled "Methods and Systems for Providing Predictive Energy Consumption Feedback for Powering a Transport Climate Control System", filed Dec. 31, 2018, 34 pages.
PCT International Application No. PCT/US2018/068129, titled "Methods and Systems for Notifying and Mitigating a Suboptimal Event Occurring in a Transport Climate Control System", filed Dec. 31, 2018, 44 pages.
PCT International Application No. PCT/US2018/068139, titled "Methods and Systems for Providing Feedback for a Transport Climate Control System", filed Dec. 31, 2018, 37 pages.
PCT International Application No. PCT/US2018/068142, titled "Methods and Systems for Providing Predictive Energy Consumption Feedback for Powering a Transport Climate Control System Using External Data", filed Dec. 31, 2018, 39 pages.
U.S. Appl. No. 16/911,692, titled "Climate Controlled Vehicle, Transport Climate Control Equipment, Method of Retrofitting a Vehicle and Method of Operation", filed Jun. 25, 2020, 39 pages.
U.S. Appl. No. 16/565,110, titled "Transport Climate Control System With a Self-Configuring Matrix Power Converter", filed Sep. 9, 2019, 52 pages.
U.S. Appl. No. 16/565,146, titled "Optimized Power Management for a Transport Climate Control Energy Source", filed Sep. 9, 2019, 53 pages.
U.S. Appl. No. 62/897,833, titled "Optimized Power Distribution to Transport Climate Control Systems Amongst One or More Electric Supply Equipment Stations", filed Sep. 9, 2019, 41 pages.
European Patent Application No. 19382776.3, titled "Mprioritized Power Delivery for Facilitating Transport Climate Control", filed Sep. 9, 2019, 41 pages.
U.S. Appl. No. 16/565,205, titled "Transport Climate Control System With an Accessory Power Distribution Unit for Managing Transport Climate Control Loads", filed Sep. 9, 2019, 54 pages.
U.S. Appl. No. 16/565,235, titled "Interface System for Connecting a Vehicle and a Transport Climate Control System", filed Sep. 9, 2019, 64 pages.
U.S. Appl. No. 16/565,252, titled "Demand-Side Power Distribution Management for a Plurality of Transport Climate Control Systems", filed Sep. 9, 2019, 44 pages.
U.S. Appl. No. 16/565,282, titled "Optimized Power Cord for Transferring Power to a Transport Climate Control System", filed Sep. 9, 2019, 43 pages.
U.S. Appl. No. 16/147,708, titled "Methods and Systems for Autonomous Climate Control Optimization of a Transport Vehicle", filed Sep. 29, 2018, 41 pages.
Extended European Search Report, issued in the corresponding European patent application No. 19219088.2, dated Jun. 9, 2020, 7 pages.

\* cited by examiner

SYSTEMS AND METHODS FOR SMART LOAD SHEDDING OF A TRANSPORT VEHICLE WHILE IN TRANSIT

FIELD

Embodiments of this disclosure relate generally to a transport climate control system for a transport vehicle. More specifically, the embodiments relate to methods and systems for predictive modeling of loads and smart load shedding while the transport vehicle is in transit.

BACKGROUND

A transport climate control system, (such as a heating, ventilation, and air conditioning (HVAC) system for a passenger vehicle (e.g., a passenger bus, passenger railcar, etc.), a transport refrigeration system (TRS) for a transport unit (e.g., a truck, a container (such as a container on a flat car, an intermodal container, etc.), a box car, a semi-tractor, a bus, or other similar transport unit), etc. may be included on a transport vehicle to condition air of an internal space (e.g., passenger compartment, cargo space, etc.) of the transport vehicle. In some transport vehicles, the transport climate control system can be installed externally (e.g., on a rooftop of the transport vehicle, on a front wall of the transport vehicle, etc.). The transport climate control system can provide a comfortable environment for the passengers in the transport vehicle or a desired environment for cargo stored in the transport vehicle.

SUMMARY

Embodiments of this disclosure relate generally to a transport climate control system for a transport vehicle. More specifically, the embodiments relate to methods and systems for predictive modeling of loads and smart load shedding while the transport vehicle is in transit.

Electric and hybrid vehicles, including battery electric vehicles, plug-in hybrids, fuel cell vehicles, and the like can be used to perform functions having scheduled or predictable routes. Examples of these electric and hybrid vehicles include transit buses, school buses, and coach buses, transport vehicles such as straight trucks and tractor-trailers, and delivery vehicles such as refrigerated vans. In such applications, HVAC and/or refrigeration loads may significantly affect power consumption when carrying out a route. Unexpected or atypical battery discharge events, such as traffic delays, unexpected stoppages, and the like can put route completion in jeopardy. The embodiments described herein can provide load shedding to allow electric and hybrid vehicles to recover from such unexpected or atypical battery discharge events and can increase the likelihood of successful route completions. This can address potential range issues for electric and hybrid vehicles and reduce risks such as out-of-service events or cargo loss.

Load shedding operations may require trade-offs in, for example passenger comfort in buses. Controlling load shedding operations based on predictive modeling of energy consumption can allow load shedding operations to be performed as needs arise and even in anticipation of significant power demands later in a route, such as the route passing through hilly areas or when ambient temperature changes can significantly impact HVAC power consumption.

In some embodiments, the predictive model of energy consumption can use data such as vehicle status data and route status data such as traffic and weather data to determine a predicted energy consumption. The predicted energy consumption can be compared to the stored energy available to the vehicle, for example a battery. This comparison can be used to determine whether to perform load shedding operations at a transport climate control system, such as an HVAC and/or refrigeration system of the vehicle. The load shedding operations may further be selected or the extent to which they are performed may be controlled based on the result of the comparison between the predicted energy consumption and the stored energy. In an embodiment, data collected during the route may be fed back into the predictive model to refine the model, for example via a machine learning algorithm.

In an embodiment, a method for shedding climate control loads at a vehicle includes obtaining vehicle status data and obtaining route condition data. The vehicle status data is status data indicative of conditions at the vehicle that affect energy storage and consumption during a route. The vehicle status data includes a stored energy amount. The route condition data is indicative of conditions along the route. The method includes determining a predicted energy consumption based on the vehicle status data and the route condition data. The method further includes and comparing the predicted energy consumption to the stored energy of the vehicle. When the predicted energy consumption exceeds the stored energy of the vehicle, the method further includes performing a load shedding operation at a transport climate control system.

In an embodiment, determining the predicted energy consumption includes determining a predicted HVAC consumption for the route. In an embodiment, the vehicle status data includes the route and the route condition data includes weather data. In an embodiment, the route for the vehicle includes a number of door openings and a predicted passenger count.

In an embodiment, determining the predicted energy consumption includes determining a predicted traction energy consumption for the route. In an embodiment, the vehicle status data includes a route for the vehicle and the route condition data includes traffic data and elevation data.

In an embodiment, performing the load shedding operation includes changing a desired climate setpoint of the transport climate control system. In an embodiment, performing the load shedding operation includes changing an operation mode of the transport climate control system. In an embodiment, performing the load shedding operation includes increasing a dead band of a compressor included in the transport climate control system. In an embodiment, performing the load shedding operation includes increasing cooling provided to a battery of the vehicle.

In an embodiment, the method further includes presenting a prompt to a user to accept or reject the load shedding operation and receiving a user input accepting or rejecting the load shedding operation, and wherein the load shedding operation is performed when the user input accepting the load shedding operation is received.

In an embodiment, at the completion of the route, feedback data including a route identifier and an energy consumption during the route are provided to the processor and a model configured to determine the predicted energy consumption is updated based on the feedback data.

In an embodiment, when the predicted energy consumption is less than the stored energy of the vehicle, a load of the transport climate control system is increased.

In an embodiment, a load shedding system of a vehicle includes an energy storage source, and an energy storage management system, configured to obtain a stored energy of the energy storage source. The load shedding system includes a communication link located on the vehicle. The load shedding system also includes a transport climate control system. The load shedding system further includes a processor, configured to obtain vehicle status data indicative of conditions at the vehicle that affect energy storage and consumption during a route, the vehicle status data including the stored energy amount, obtain route condition data indicative of conditions along the route, determine a predicted energy consumption based on the vehicle status data and the route condition data, compare the predicted energy consumption to the stored energy of the vehicle; and when the predicted energy consumption exceeds the stored energy of the vehicle, direct performance of a load shedding operation at the transport climate control system.

In an embodiment, the transport climate control system is a vehicle HVAC system.

In an embodiment, the processor is included in a controller located at a vehicle.

In an embodiment, the processor is located remote from the vehicle.

In an embodiment, the energy storage source includes one or more batteries.

In an embodiment, the load shedding system further includes a door sensor configured to detect a status of a door of a space receiving climate control from the transport climate control system.

In an embodiment, the transport climate control system is configured to provide cooling to the energy storage source.

DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Embodiments of this disclosure relate generally to a transport climate control system for a transport vehicle. More specifically, the embodiments relate to methods and systems for predictive modeling of loads and smart load shedding while the transport vehicle is in transit.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

A transport climate control system may be generally configured to control one or more environmental conditions (e.g., temperature, humidity, atmosphere, air quality, etc.) in an internal space (e.g., passenger compartment, cargo space, etc.) of a transport vehicle (e.g., a bus, a passenger railcar, a truck, a container (such as a container on a flat car, an intermodal container, etc.), a box car, a semi-tractor, etc.). Generally, the internal space of a transport vehicle can be supplied with fresh air (e.g., outside air) and/or conditioned air (e.g., air conditioned by a refrigeration circuit of the transport climate control system) by the transport climate control system.

Figure 1A:
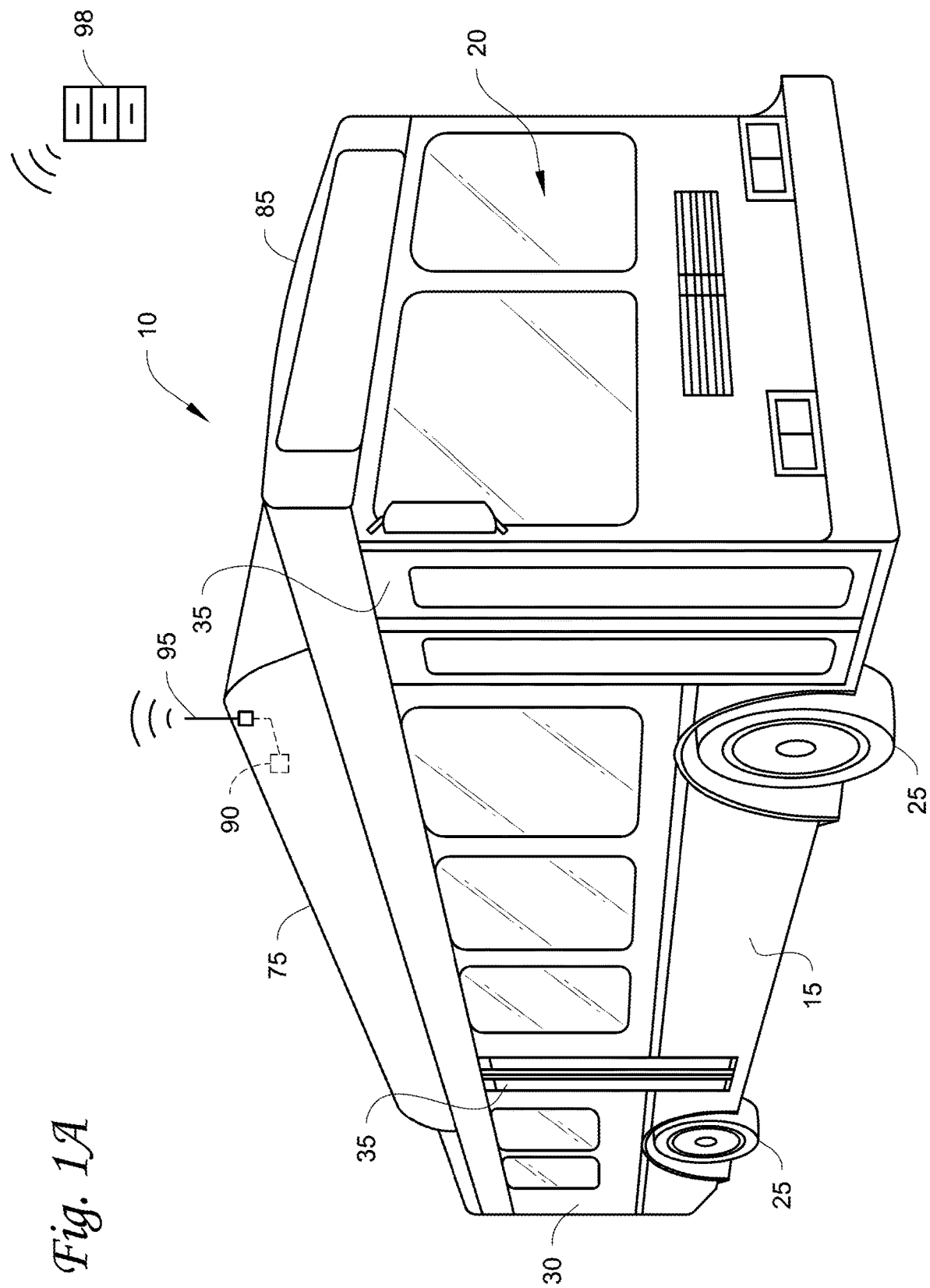
FIG. 1A is a perspective view of a passenger vehicle including a transport climate control system, according to one embodiment.

FIG. 1A is a perspective view of a vehicle 10 including a transport climate control system, according to one embodiment. In the embodiment illustrated in FIG. 1A, the vehicle 10 is a mass-transit bus that can carry passenger(s) (not shown) to one or more destinations. In other embodiments, the vehicle 10 can be a school bus, railway vehicle, subway car, or other commercial vehicle that carries passengers. Hereinafter, the term "vehicle" shall be used to represent all such passenger vehicles, and should not be construed to limit the scope of the application solely to mass-transit buses.

FIG. 1A shows that the vehicle 10 includes a frame 15, a passenger compartment 20 supported by the frame 15, wheels 25, and a compartment 30. The frame 15 includes doors 35 that are positioned on a side of the vehicle 10. As shown in FIG. 1A, a first door 35 is located adjacent to a forward end of the vehicle 10, and a second door 35 is positioned on the frame 15 toward a rearward end of the vehicle 10. Each door 35 is movable between an open position and a closed position to selectively allow access to the passenger compartment 20. The vehicle 10 also includes a transport climate control system 75 attached to the frame 15 on a roof 85 of the vehicle 10.

The transport climate control system 75 includes a refrigeration circuit (see FIG. 2) and is configured to provide conditioned air within the passenger compartment 20. The compartment 30 is located adjacent the rear end of the vehicle 10, can include a power system (see FIG. 2) that is coupled to the frame 15 to drive the wheels 25. In some embodiments, the compartment 30 can be located in other locations on the vehicle 10 (e.g., adjacent the forward end, etc.).

The transport climate control system 75 also includes a climate controller 90 and one or more sensors (not shown) that are configured to measure one or more parameters of the transport climate control system 75 and communicate parameter data to the climate controller 90. The climate controller 90 is configured to control operation of the transport climate control system 75. The programmable climate controller 90 may comprise a single integrated control unit 90 or may comprise a distributed network of climate controller elements. The number of distributed control elements in a given network can depend upon the particular application of the principles described herein.

The transport climate control system 75 may be configured to perform one or more load shedding operations. The load shedding operation may include one or more of changing a desired climate setpoint of the transport climate control system 75, changing an operation mode of the transport climate control system 75, increasing a deadband in the transport climate control system 75, and utilizing ambient air for climate control.

Changing a desired climate setpoint of the transport climate control system 75 includes changing the desired temperature to be maintained in vehicle 10 by transport climate control system 75, for example to be closer to the ambient temperature outside of vehicle 10. By reducing the difference between the desired climate setpoint and the ambient environment, energy costs for operating the transport climate control system 75 can be reduced.

The load shedding operation may include changing an operation mode of transport climate control system 75. The operation mode may be a cooling mode where a compressor and evaporator fans are being operated to provide cooling to the passenger compartment 20, a heating mode to provide heating to the passenger compartment 20, a defrost mode for defrosting an evaporator coil of the transport climate control system 57, a null mode where the compressor is not being operated, a dehumidification mode for dehumidifying air in the passenger compartment 20, a reheat mode, or the like. A reheat mode may include cooling the air to condition it by, for example, removing humidity, then heating the air as needed to maintain the desired set point temperature. The reheat mode can require near-continuous use of the compressor which can increase energy consumption. Some modes such as dehumidification or reheat modes may provide optional adjustments to air quality. In one example of load shedding operations, one or more of these optional air quality adjusting operating modes may be deactivated to reduce energy consumption by transport climate control system 75.

Increasing a deadband of the transport climate control system 75 can reduce the cycling of a compressor of transport climate control system 75. Increasing the deadband can be achieved by, for example, increasing permitted deviations from a desired temperature setpoint, introducing delay periods between compressor deactivation and subsequent activation, or the like. For example, the permissible deviation from the desired temperature setpoint may be changed from +/−5 degrees Fahrenheit to +/−10 degrees Fahrenheit.

Using ambient air for climate control may include opening dampers to introduce the ambient air into the passenger compartment 20, instead of operating the transport climate control system 75. Use of ambient air for climate control may be based on ambient air conditions such as temperature and humidity.

In an embodiment, the load shedding operation performed at transport climate control system 75 includes increasing an amount of cooling provided to an energy storage source cooler. Increasing cooling at the cooler may reduce the discharge of the energy storage source under particular conditions. When, for example, an energy storage source (e.g., a battery) is above a certain temperature, it may discharge more quickly. The battery temperature may increase when it is under high loads, thus causing extremely rapid discharge. This excessive discharge may be reduced or prevented by ensuring sufficient cooling. For example, increasing the load at transport climate control system 75 to increase cooling, and directing that cooling to the cooler may allow vehicle 10 to maintain desirable battery temperatures even under high loads. The increased cooling at 306 can reduce the discharge of energy storage source 304 during high traction energy usage, for example, climbing hills or frequent starting and stopping.

The load shedding operations may be directed by the climate controller 90. In an embodiment, the load shedding operation may be directed by a communication between transport climate control system 75 and a remote server 98 via a communications antenna 95. Communications antenna 95 may be, for example, a cellular antenna providing a wireless data connection such as, for example, a global system for mobile communications (GSM), 3 G, 4 G, LTE, and/or other such connections. Remote server 98 may be configured to provide weather and traffic data to the climate controller 90. In an embodiment, remote server 98 is configured to determine a predicted energy consumption of vehicle 10 or transport climate control system 75. In an embodiment, remote server 98 is configured to manage energy consumption by directing transport climate control system 75 to perform a load shedding operation.

In an embodiment, climate controller 90 can be configured to direct transport climate control system 75 to perform a load shedding operation. In an embodiment, climate controller 90 is configured to determine a predicted energy consumption, compare the predicted energy consumption to a stored energy, and direct the performance of one or more load shedding operations.

Figure 1B:
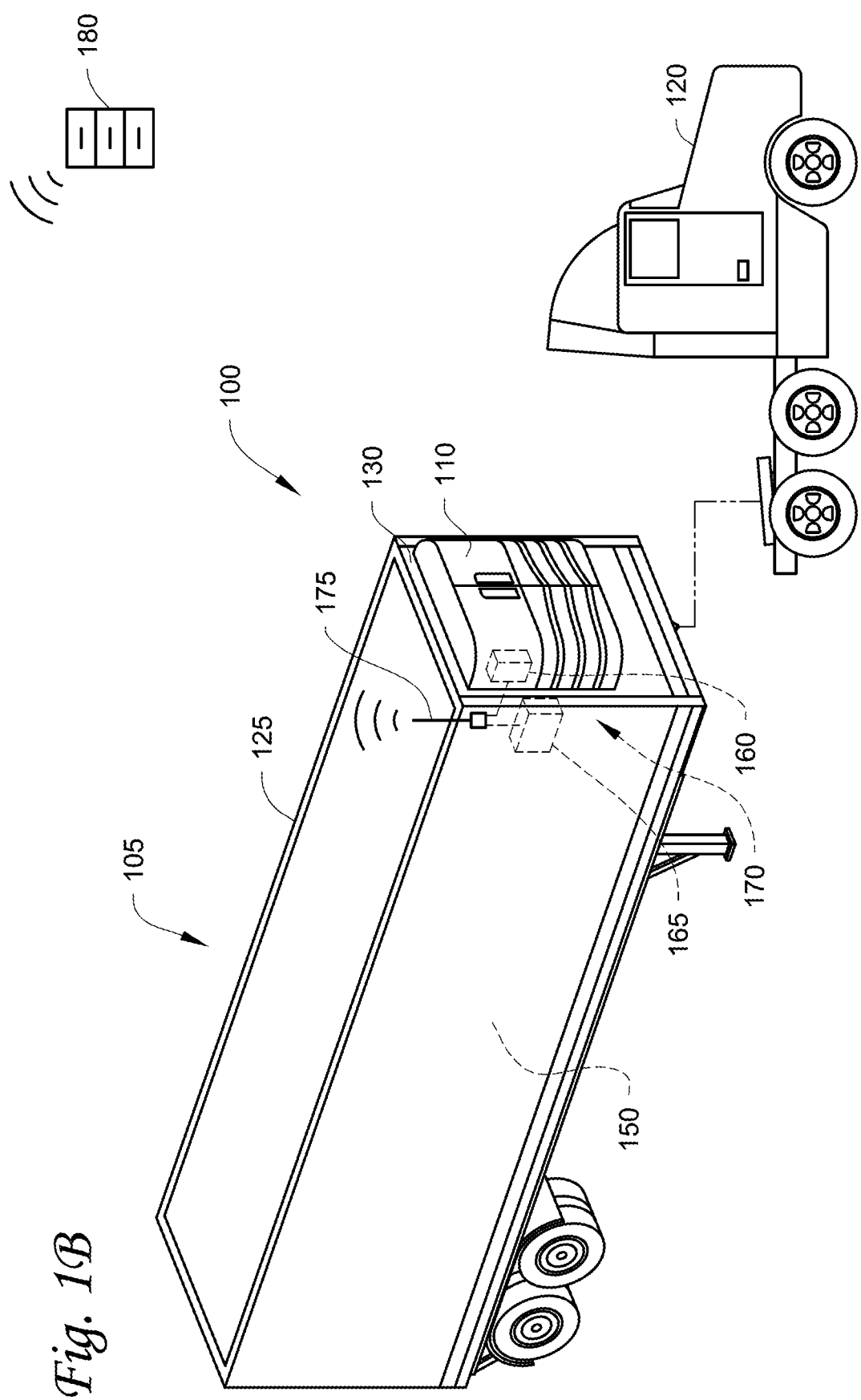
FIG. 1B is a perspective view of a refrigerated transport unit attached to a tractor, according to one embodiment.

FIG. 1B illustrates one embodiment of a refrigerated transport unit 105 attached to a tractor 120. The refrigerated transport unit 105 includes a transport climate control system 100 for a transport unit 125. The tractor 120 is attached to and is configured to tow the transport unit 125. The transport unit 125 shown in FIG. 1B is a trailer. It will be appreciated that the embodiments described herein are not limited to tractor and trailer units, but can apply to any type of transport unit (e.g., a container on a flat car, an intermodal container, etc.), a truck, a box car, or other similar transport unit. The transport unit 125 can include one or more doors (not shown) that are movable between an open position and a closed position to selectively allow access to a cargo space 150. The transport climate control system 100 includes a climate control unit (CCU) 110 that provides environmental control (e.g. temperature, humidity, air quality, etc.) within the cargo space 150 of the transport unit 125.

The CCU 110 is disposed on a front wall 130 of the transport unit 125. In other embodiments, it will be appreciated that the CCU 110 can be disposed, for example, on a rooftop or another wall of the transport unit 125. The CCU 110 includes a refrigeration circuit (see FIG. 2) for conditioning air to be provided within the cargo space 150. The CCU 110 can also include a power system (see FIG. 2) to power components of the transport climate control system 100 (e.g., a compressor, one or more fans and blowers, one or more sensors, one or more solenoid valves, etc.).

The transport climate control system 100 also includes a climate controller 170 and one or more sensors (not shown) that are configured to measure one or more parameters of the transport climate control system 100 and communicate parameter data to a climate controller 170. The climate controller 170 is configured to control operation of the transport climate control system 100. The programmable climate controller 170 may comprise a single integrated control unit 160 or may comprise a distributed network of climate controller elements 160, 165. The number of distributed control elements in a given network can depend upon the particular application of the principles described herein.

The transport climate control system 100 may be configured to be capable of performing one or more load shedding operations. The load shedding operations operation may include one or more of changing a desired climate setpoint of transport climate control system 100, changing an operation mode of the transport climate control system 100, increasing a deadband in the transport climate control system 100, and utilizing ambient air for climate control. In an embodiment, the load shedding operation includes increasing an amount of cooling provided to an energy storage source, for example a battery (not shown) included in, for example, CCU 110 or tractor 120.

In an embodiment, climate controller 170 can be configured to direct transport climate control system 100 to perform a load shedding operation. In an embodiment, climate controller 170 is configured to determine a predicted energy consumption, compare the predicted energy consumption to a stored energy, and direct the performance of one or more load shedding operations.

Programmable climate controller 170 may communicate with remote server 180 via communications antenna 175. Remote server 180 may be configured to provide weather and traffic data to programmable climate controller 170. In an embodiment, remote server 180 is configured to determine a predicted energy consumption of tractor 120 and/or transport climate control system 100. In an embodiment, remote server 180 is configured to manage energy consumption by directing transport climate control system 100 to perform a load shedding operation.

Figure 2:
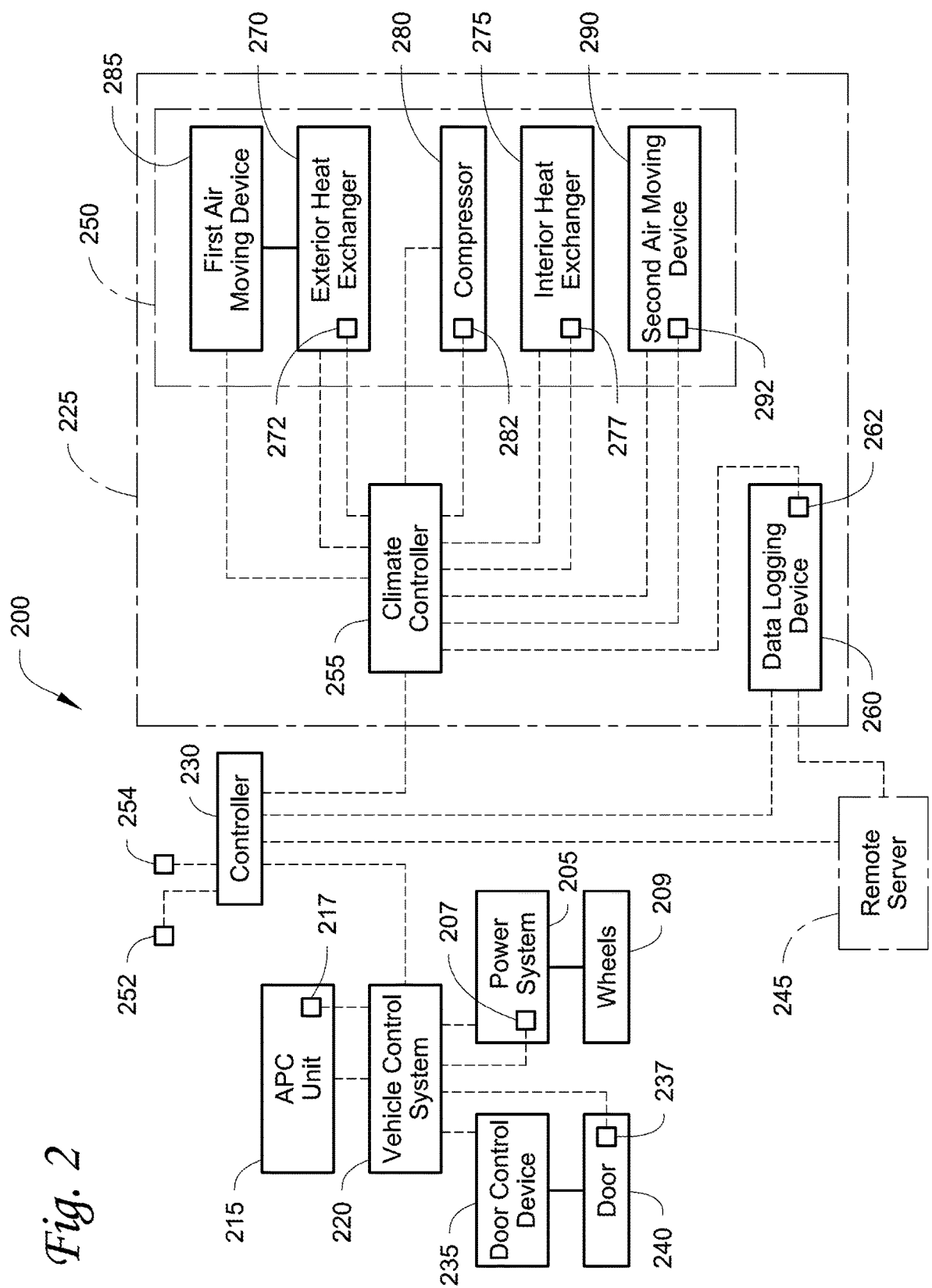
FIG. 2 is a schematic view of components of the transport vehicle shown in either of FIGS. 1A and 1B, according to one embodiment.

FIG. 2 illustrates a schematic view of components of a transport vehicle 200 such as the transport vehicle 10 shown in FIG. 1A or the transport unit 100 shown in FIG. 1B. FIG. 2 shows a power system 205 that can be a fully electrical power system (e.g., powered by an energy storage source) without a corresponding prime mover. In other embodiments, the power system 205 can include a prime mover (e.g., an internal combustion engine), or alternatively, a hybrid engine that includes an electrical power system coupled to the prime mover. Hereinafter, the term "power system" shall be used to represent all such power systems, and should not be construed to limit the scope of the application solely to fully electrical power systems.

In the embodiment shown in FIG. 2, the power system 205 can provide most, if not all of the power to vehicle components and accessories, in addition to powering wheels 209 (e.g., the wheels 25 shown in FIG. 1A), and can include an "off" state and an "on" state. Generally, the vehicle 200 is operable at one or more speeds, and the power system 205 can be the main driving component or mechanism for the speed that the vehicle 200 travels. The power system 205 can be further operable at relatively high loads and relatively low loads. The load that the power system 205 is under is defined by the amount of work per time unit that must be provided by the power system 205 to move and operate the vehicle 200. In other words, the load of the power system 205 can be defined by the amount of output power that must be provided by the power system 205 to move and operate the vehicle 200. For example, the power system 205 can be under relatively high loads when the vehicle 200 is moving uphill or over rough terrain. The power system 205 can be under relatively low loads when the vehicle 200 is moving downhill, when the vehicle 200 is moving over relatively flat terrain, or when the power system 205 is idling. Generally, a change in the load of the power system 205 can be indicated by a change in the output power of the power system 205 that is measured, for example, in kilowatts or horsepower.

In some embodiments, the power system 205 can be dedicated to powering a transport climate control system 225. In these embodiments, the power system 205 may not power the wheels 209. In these embodiments, the power system 205 can be located in a TRU (e.g., the TRU 110) or can be disposed apart from the TRU such as in an undermount configuration.

A power system sensor 207 is coupled to the power system 205 to sense a condition and/or usage of the power system 205, and to generate a signal indicative of the power system condition. In some embodiments, the power system sensor 207 can be configured to detect the load under which the power system 205 is operating. In these embodiments, the power system sensor 207 can generate a signal indicative of the power system load. In other embodiments, the sensor 207 can be configured to detect startup of the power system 205 from the "off" state.

With continued reference to FIG. 2, the transport vehicle 200 can also include an automated passenger counter (APC) unit 215 that is operable to track the number and duration of passengers (e.g., people, animals, etc.) in the internal space of the transport vehicle 200 at any time. The APC unit 215 includes an APC sensor 217 that senses when a passenger enters or exits the transport vehicle 200. It has been found that passengers (e.g., people, animals, etc.) have natural convection (i.e., thermal plume) that radiates heat and moisture to the surrounding environment. A conditioned internal space can be affected by the thermal plume surrounding a passenger. Thus, data from the APC unit 215 can be used to calculate a relative humidity within the internal space of the transport vehicle 200 at any given time.

The transport vehicle 200 also includes a vehicle control system 220, a transport climate control system 225 (e.g., the transport climate control system 75 shown in FIG. 1A and the transport climate control system 200 shown in FIG. 1B), and a controller 230 in communication with the vehicle control system 220 and the transport climate control system 225. The vehicle control system 220 can be located anywhere on the transport vehicle 200, and is in communication electrical and/or mechanical components (not shown) of the transport vehicle 200. The vehicle control system 220 is also in communication with a door control device 235, the power system 205, and the vehicle positioning system 215 to receive the respective signals from a door sensor 237, the power system sensor 207, and the vehicle position sensor 217. In some embodiments, additional vehicle conditions of the transport vehicle 200 may also be sensed by one or more sensors.

The transport vehicle 200 includes a door control device 235 that is coupled to each door 240 (only one shown). The door control device 235 is operable to move the doors 240 between the respective open positions and closed positions. In some embodiments, the door control device 235 is manually operated by an operator of the transport vehicle 200 to open and close the doors 240. In other embodiments, the door control device 235 can automatically open and close the doors 240 (e.g., via electronic signals, etc.). In still other embodiments, one door control device 235 can be provided for each door 240 of the vehicle 200 to independently open and close each door 240.

The door sensor 237 is coupled to each door 240 to sense when and for how long one or all doors 240 are in the open position, and to generate a signal indicative of the respective positions and durations of the doors 240. For example, the door sensor 237 can generate a first signal indicative of one or all doors 240 in the open position and the duration of the open position, and can generate a second signal indicative of the doors 240 in the closed position and the duration of the closed position. The door opening frequency and duration information obtained by the door sensor 237 can be combined with information obtained from the APC unit 215 to determine the effect of thermal plume within the internal space.

Alternatively, no signal may be affirmatively generated by the door sensor 237 when the doors 240 are in the closed position (i.e., the sensor is "silent" when the doors 240 are in the closed position). However, the silence of the door sensor 237 when the doors 240 are closed can be indicative of the doors 240 in the closed position. In some embodiments, one door sensor 237 may be coupled to both or all doors 240. In other embodiments, a door sensor 237 may be provided for each door 240 to independently sense the position of the respective door 240.

FIG. 2 shows that the transport climate control system 225 includes a refrigeration circuit 250, a climate controller 255, and a data logging device 260. The refrigeration circuit 250 is a vehicle climate control circuit that can be operable to control one or more environmental conditions (e.g., temperature, humidity, atmosphere, air quality, etc.) of the internal space of the transport vehicle 200 based on geolocation specific data, climate control data, and passenger/load data. The refrigeration circuit 250 includes an exterior heat exchanger 270, an interior heat exchanger 275, a compressor 280, a first air moving device 285, and a second air moving device 290. In the illustrated embodiment, the first and second air moving devices 285, 290 are fans. The refrigeration circuit 250 may also include additional components (not shown). A working fluid (e.g., refrigerant) flows through the refrigeration components to provide conditioned air to the internal space (e.g., the passenger compartment 20 shown in FIG. 1A and the cargo space 150 shown in FIG. 1B).

The speed of the refrigeration circuit 250 can be defined as the speed of working fluid flow through the exterior heat exchanger 275 and/or the interior heat exchanger 270. The speed of the refrigeration circuit 250 can be also defined as the speed of the compressor 280, the speed of the first air moving device 285, and/or the speed of the second air moving device 290, in addition to the speed of other components of the refrigeration circuit 250.

In some constructions, the exterior heat exchanger 270 can cool heated working fluid that flows from the compressor 280 in a cooling mode of the refrigeration circuit 250. The exterior heat exchanger 270 may include a gas cooler, or alternatively a condenser, depending on the type of working fluid routed through the refrigeration circuit 250. In other constructions, the exterior heat exchanger 270 can heat cooled working fluid in a heating mode of the refrigeration circuit 250.

Although not shown, the interior heat exchanger 275 (e.g., evaporator, etc.) can be in fluid communication with the exterior heat exchanger 270 to receive cooled working fluid and to transfer heat from air passing over the interior heat exchanger 275 to the working fluid prior to the conditioned air entering the internal space. The compressor 280 is in fluid communication with the exterior heat exchanger 270 and the interior heat exchanger 275 to compress heated working fluid received from the interior heat exchanger 275 and to provide working fluid flow throughout the refrigeration circuit 250. In some embodiments, the compressor 280 can be a one-speed (e.g., On state and Off state) compressor. In other embodiments, the compressor 280 30 can be a two-speed compressor (e.g., high speed and low speed). In yet some other embodiments, the compressor 280 can be a variable speed compressor that can operate at multiple speeds. The speed of the compressor 280 can be based in part on a desired pressure of the working fluid within the refrigeration circuit 250.

Generally, the first and second air moving devices 285, 290 include fans or blowers that direct airflow across one or more components of the refrigeration circuit 250. In some embodiments, the first and second air moving devices 285, 290 can be one-speed (e.g., On state and Off state) moving devices. In other embodiments, the first and second air moving devices 285, 290 can be two-speed (e.g., high speed and low speed) moving devices. In some embodiments, the first and second air moving devices 285, 290 can be variable speed moving devices that can operate at multiple speeds. The first air moving device 285 is coupled to the exterior heat exchanger 270, and the speed of the first air moving device 285 can be based on desired airflow across the exterior heat exchanger 270. The first air moving device 285 can generally direct air across the exterior heat exchanger 270 to cool heated, compressed working fluid that flows from the compressor 280.

The second air moving device 290 is coupled to the interior heat exchanger 275, and the speed of the second air moving device 290 can be based on desired airflow across the interior heat exchanger 275. The second air moving device 290 can generally direct air across the interior heat exchanger 275 to condition air entering the internal space via heat transfer with cool working fluid flowing through the interior heat exchanger 275.

The climate controller 255 is in communication with the compressor 280 to control compressor capacity, and is in communication with the first and second air moving devices 285, 290 to control the speed of the first and second air moving devices 285, 290. The climate controller 255 is operable to vary the refrigeration circuit 250 between an "off" state and an "on" state, and to further control the capacity of the refrigeration circuit 250 based in part on the desired temperature of the internal space, and further based on ambient conditions adjacent to the transport climate control system 225. In some embodiments, the climate controller 255 can include a memory portion (not shown) that stores a desired climate setpoint (e.g., a desired temperature setpoint within the internal space, a desired humidity setpoint within the internal space, a desired discharge temperature setpoint, etc.).

The climate controller 255 is also in communication with a discharge temperature sensor 292, an interior heat exchanger sensor 277, a compressor sensor 282, and an exterior heat exchanger sensor 272. When present, the climate controller 255 can also be in communication with one or more internal space temperature sensors 252 and/or one or more internal space humidity sensors 254. The climate controller 255 may also be in communication with other sensors (not shown) that are coupled to components of the refrigeration circuit 250. The discharge temperature sensor 292 is disposed adjacent to the second air moving device 290 to sense a discharge temperature of conditioned air directed into the internal space.

The climate controller 255 is configured to direct transport climate control system 225 to perform one or more load shedding operations. The load shedding operation may include one or more of changing a desired climate setpoint of the transport climate control unit 225, changing an operation mode of the transport climate control unit 225, increasing a deadband in the transport climate control unit 225 to reduce cycling of compressor 280, and utilizing ambient air for climate control to reduce use of refrigeration circuit 250 and its powered components including air moving devices 285, 290, and compressor 280.

The interior heat exchanger sensor 277 is coupled to the interior heat exchanger 275 to sense a temperature of the working fluid flowing through the interior heat exchanger 275, and to generate a signal indicative of the working fluid temperature. In other embodiments, the interior heat exchanger sensor 277 can sense the temperature of air flowing over the interior heat exchanger 275. In still other embodiments, the interior heat exchanger sensor 277 can sense a pressure of working fluid that flows through the interior heat exchanger 275.

The compressor sensor 282 is coupled to the compressor 280 to sense a pressure of working fluid that flows through the compressor 280. In some embodiments, the compressor sensor 282 can monitor the pressure of the working fluid that enters the compressor 280 (i.e., the suction pressure). In other embodiments, the compressor sensor 282 can monitor the pressure of working fluid that exits the compressor 280 (i.e., the discharge pressure). In still other embodiments, the compressor sensor 280 may be configured to sense the discharge pressure and the suction pressure of the working fluid flowing through the compressor 280.

The exterior heat exchanger sensor 272 is coupled to the exterior heat exchanger 270 to sense a temperature of working fluid exiting the exterior heat exchanger 270, and to generate a signal indicative of the sensed temperature. In some embodiments, the exterior heat exchanger sensor 272 can be located in a refrigeration line (not shown) that is proximate to and downstream of the exterior heat exchanger 270.

The one or more internal space temperature sensors 252 can be disposed at various locations within the internal space to sense a temperature within the internal space. The one or 25 more internal space humidity sensors 254 can be disposed at various locations within the internal space to sense humidity within the internal space.

The refrigeration circuit 250 can be operable at various capacities, ranging from a zero capacity in an Off state to a full capacity in an On state. The capacity of the refrigeration circuit 250 is the capacity at which the refrigeration circuit 250 is able to condition air that enters the internal space.

A full capacity of the refrigeration circuit 250 can correspond to a pull-down cooling mode of the transport climate control system 225, and a reduced capacity (i.e., a capacity that is less than full capacity) of the refrigeration circuit 250 can correspond to a reduced capacity cooling mode or a noise reduction mode of the transport climate control system 225. Generally, the speed of one or more transport climate control system components in the reduced capacity mode or the noise reduction mode are slower than the speed of the same components in the pull-down cooling mode, and operation of the transport climate control system 225 in the noise reduction mode can reduce perceived noise that emanates from the transport climate control system 225. For example, when the transport climate control system 225 operates at full capacity (i.e., in the pull-down cooling mode), the refrigeration 10 circuit 250 can operate at a speed that can quickly reduce the temperature within the internal space from a near ambient temperature to a desired temperature setpoint. In some embodiments, when the transport climate control system 225 operates at a reduced capacity (e.g., in the reduced capacity mode, the noise reduction mode, etc.), the refrigeration circuit 250 can operate at a speed that is slower than the speed necessary to maintain the desired temperature setpoint of the internal space.

The transport climate control system 225 is configured to operate in a variety of operating modes including, for example, a continuous cooling mode, a cycle-sentry cooling mode, a pull-down cooling mode, a reduced capacity cooling mode, a heating mode, a defrost mode, an emissions (e.g., noise, CO2, particular matter, nitrogen oxide, etc.) reduction mode, a fuel reduction mode, a humidity reduction mode, a ventilation mode, a reheating mode, etc. The continuous cooling mode can allow the compressor 280 to continuously remain in an On state so that the refrigeration circuit 250 can provide cooled air into the internal space. The cycle-sentry cooling mode can allow the compressor 280 to operate in a pattern of On state and Off state cycles over a period of time so that the refrigeration circuit 250 can provide cooled air into the internal space. The pull-down cooling mode can allow the refrigeration circuit 250 to operate at a full capacity to quickly reduce the temperature within the internal space from a near ambient temperature to a desired temperature setpoint. The reduced capacity cooling mode can allow the refrigeration circuit 250 to operate at a reduced capacity to slow down or stop temperature reduction within the internal space. The heating mode can allow the refrigeration circuit 250 to provide heated air to the internal space to increase the temperature within the internal space. The defrost mode can allow the refrigeration circuit to defrost, for example, evaporator coils of the interior heat exchanger 275. The emissions reduction mode can allow the refrigeration circuit 250 to operate such that emissions of one or more of noise, CO2, particular matter, nitrogen oxide, etc. from the transport climate control system 225 are reduced. The fuel reduction mode can allow the transport climate control system 225 to reduce the amount of fuel used to operate the transport climate control system 225. The humidity reduction mode can reduce humidity in the internal space by, for example, running the secondary air moving device 290 independently of the compressor 280.

The data logging device 260 is configured to receive and store real-time information regarding the transport vehicle 200 and the transport climate control system 225. The data logging device 260 can also operate as a telematics unit and transmit the real-time information regarding the transport vehicle 200 and the transport climate control system 225 to a host service. In some embodiments, the data logging device 260 can be a first party data logging and telematics device of the transport climate control system 225 or a third party data logging and telematics device that is separate from the transport climate control system 225. The data logging device 260 can also include a vehicle position sensor 262. The vehicle position sensor 262 can be a global positioning system sensor in communication with a global positioning system (not shown) that determines the location of the transport vehicle 200.

In some embodiments, the data logging device 260 can utilize, for example, GSM or a general packet radio service (GPRS) to access real-time ambient temperature and/or humidity data external to the location of the transport vehicle 200. In some embodiments, the data logging device 260 can access the real-time 20 ambient temperature and/or humidity information at the location determined by the vehicle position sensor 262 from, for example, the National Oceanic and Atmospheric Administration (NOAA). In some embodiments, data logging device 260 is configured to log data collected during the route, such as number of stops, number of door openings, passenger data such as number of passengers and/or passenger count over time during the route, an identifier for the route taken by the vehicle, energy consumption during the route (e.g. starting and ending energy levels at an energy storage source of the vehicle) and the like, and report this data to remote server 245 so that a predictive model of energy consumption It will be appreciated that in other embodiments, the vehicle position sensor 262 can be part of, for example, the climate controller 255, the controller 230, the vehicle control system 25 220, or another device of the transport vehicle 200. Also, in some embodiments, the data logging device 260 can be embedded in or with the climate controller 255.

The controller 230 is disposed in the vehicle 200, and generally can be located anywhere on the vehicle 200. The controller 230 is in communication with the vehicle control system 220 and the transport climate control system 225 to monitor conditions of the vehicle 200 and the climate control system 225, and to control the transport climate control system 225 in response to the sensed temperature within the internal space and the sensed vehicle conditions. In some embodiments, the controller 230 can be a stand-alone controller 230 in addition to the vehicle control system 220 and the climate controller 255. In other embodiments, the vehicle control system 220 and/or the climate controller 255 can be a part of or subsumed in the controller 230.

In some embodiments, the controller 230 and/or the data logging device 260 can communicate with a remote server 245 that is separate and away from the transport vehicle 200. The controller 230 and/or the data logging device 260 can transmit energy parameters to the remote server 245 and the remote server can then predict energy utilization of the transport climate control system 225, calculate energy costs of the transport climate control system 225, determine whether to perform load shedding operations at transport climate control system 225, etc. In an embodiment, remote server 245 hosts a predictive model for energy consumption by transport climate control loads, traction loads, and/or accessory loads at a vehicle. The predictive model at remote server 245 may be, for example, one or more predetermined equations, lookup tables, machine learning algorithms, or the like. In an embodiment, this predictive model may be hosted on the vehicle, for example at controller 230.

Figure 3:
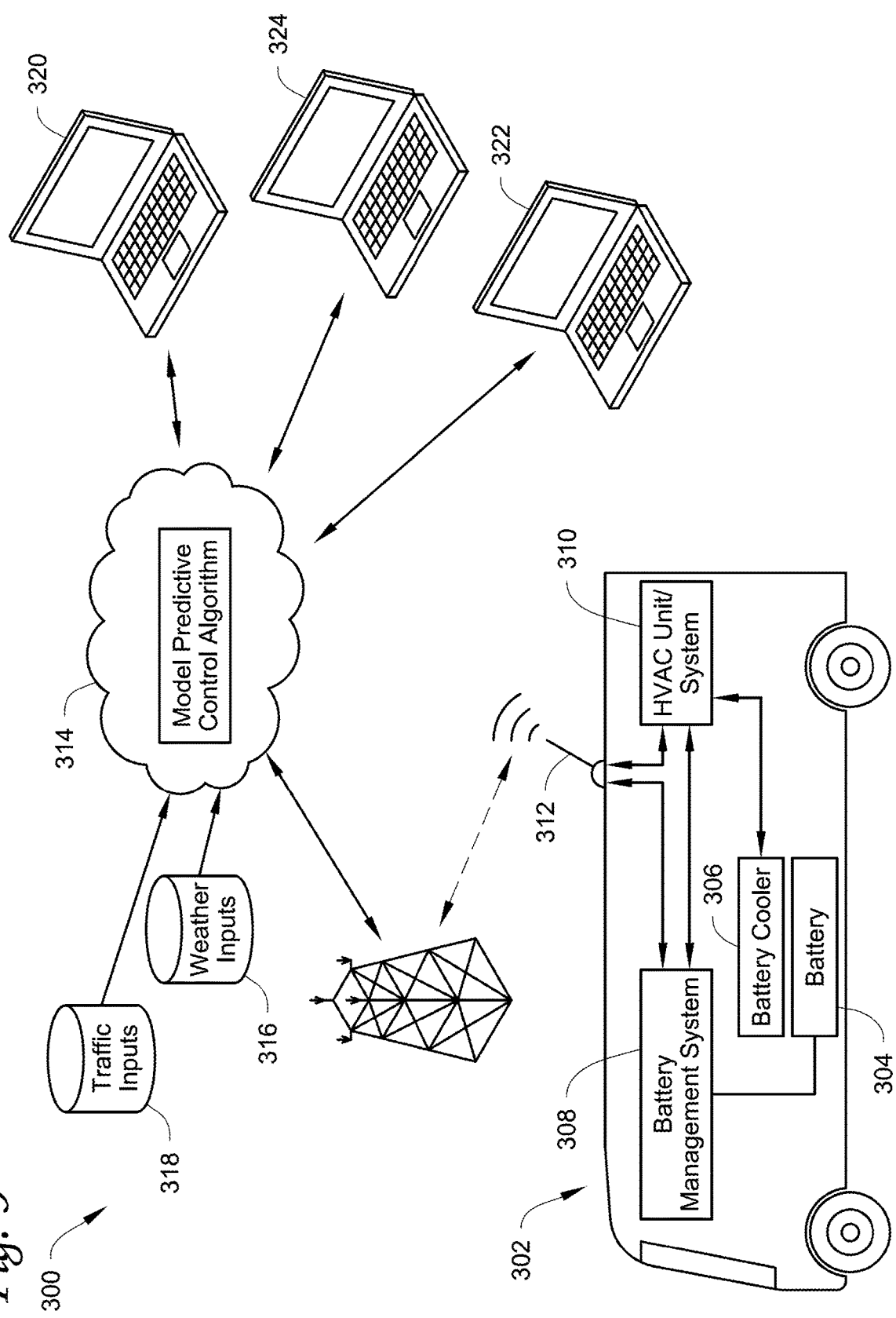
FIG. 3 is a schematic of a system for predictive modeling and load shedding, according to an embodiment.

FIG. 3 is a schematic of a system 300 for predictive modeling and load shedding, according to an embodiment.

System 300 includes a vehicle 302. Vehicle 302 may be, for example, a transit bus such as vehicle 10 shown in FIG. 1A. Embodiments of system 300 may be included in other varieties of vehicles 302, for example straight trucks, refrigerated vans, or tractor-trailers such as tractor 120 and transport unit 125 as shown in FIG. 1B.

Vehicle 302 includes an energy storage source 304. The energy storage source 304 may be, for example, one or more batteries, a fuel cell, a flywheel power storage system, or the like. The energy storage source 304 stores and provides power for operation of one or more loads of the vehicle 302. The one or more loads include, for example, a transport climate control system 310 that provides climate control to an internal space of the vehicle 302. In an embodiment, energy storage source 304 can be used to provide power to traction loads in vehicle 302, i.e. one or more motors used to drive the wheels of vehicle 302.

The energy storage source 304 may further include a cooler 306. Cooler 306 may provide cooling to the energy storage source 304, for example for managing battery temperature where energy storage source 304 includes one or more batteries. The cooler 306 may receive cool air or other fluid from transport climate control system 310 included in vehicle 302. Cooling, for example, batteries of the energy storage source 304 may affect their discharge properties as power is drawn from them. For example, increasing a HVAC load to ensure proper battery temperatures may reduce discharge during periods where the traction system of the vehicle 302 is drawing large amounts of power from the energy storage source 304, such as during hill climbing or stop-and-go traffic.

The energy storage source 304 interfaces with an energy storage management system 308. In an embodiment, the energy storage management system 308 can be a battery management system. The energy storage management system 308 is configured to obtain a level of energy (e.g., charge level) stored by the energy storage source 304. The energy storage management system 308 can provide the level of energy stored at the energy storage source 304 to the model predictive control algorithm 314 via a wireless or wired connection. In an embodiment, an antenna 312 is used to transmit the level of energy from energy storage management system 308 to model a predictive control algorithm 314.

In the embodiment shown in FIG. 3, the transport climate control system 310 is an HVAC system of a transit bus, such as vehicle 10 shown in FIG. 1B. Transport climate control system 310 may be, for example, a transport refrigeration system included in a straight truck, for example cooling transport unit 100 in FIG. 1B. In an embodiment, transport climate control system 310 provides cooling utilized by cooler 306 to cool energy storage source 304. Transport climate control system 310 can draw power from the energy storage source 304.

The antenna 312 is configured to allow communications between system components located at vehicle 302 and other system elements, for example via the internet. Antenna 312 may be, for example, a cellular antenna providing a wireless data connection such as, for example, 3 G, 4 G, LTE, and/or other such connections.

The system 300 includes the model predictive control algorithm 314. In the embodiment shown in FIG. 3, model predictive control algorithm 314 is shown as being hosted in the cloud, on a server separate and remote from vehicle 302. When model predictive control algorithm 314 is located remote from vehicle 302, the model predictive control algorithm may supply a controller at the vehicle 302, such as controller 230 shown in FIG. 2 with, for example, the predicted energy consumptions for completing a route, an instruction to perform load shedding operations, or an instruction to perform particular load shedding operations. In an embodiment, model predictive control algorithm 314 can be hosted on the vehicle 302, for example at controller 230 or climate controller 255 as those are shown in FIG. 2. In this embodiment, model predictive control algorithm 314 receives the route condition data such as traffic and weather data via antenna 312.

Model predictive control algorithm 314 is configured to predict energy requirements for completing a route. The predicted energy consumption for completing the route may include, for example, transport climate control energy consumption of transport climate control system 310 and traction energy consumption of vehicle 302. The energy requirements may further include predicted energy consumption of controls and/or accessory devices, for example based on estimated remaining duration for the route.

In an embodiment, the model predictive control algorithm 314 can determine a predicted transport climate control energy consumption. The predicted transport climate control energy consumption may be determined based on parameters affecting the energy consumption for operating the transport climate control unit 310. The parameters may include, for example, number and/or duration of door openings, number of passengers, remaining duration of the route, ambient temperature, temperature forecasts, solar intensity, cloud cover, and the like. The predicted transport climate control energy consumption may be determined using a predictive model. The predictive model may be, for example, a lookup table, a mathematical model, a machine learning algorithm, or the like.

In an embodiment, the model predictive control algorithm 314 can determine a predicted traction energy consumption for the vehicle 302. The predicted traction energy consumption is an amount of energy required to drive movement of the vehicle, for example powering one or more motors driving the wheels of vehicle 302 to completion of the route. The traction energy consumption may be predicted using a predictive model. The predictive model may be, for example, a lookup table, a machine learning algorithm, or the like. The predictive model may determine the predicted traction energy consumption based on parameters affecting energy consumption during the remaining portion of the route, such as the distance remaining, expected speed, expected numbers of starting and stopping operations, expected changes in elevation, and other such factors affecting the energy required to successfully reach complete the route. In an embodiment, the traction energy consumption is based on a route length, traffic data, and elevation data including changes of elevation along the route.

Model predictive control algorithm 314 may be configured to compare the predicted energy consumption to the energy level at vehicle 302, for example obtained from the energy management system 308. Model predictive control algorithm 314 may be configured to direct performance of a load shedding operation when the predicted energy consumption exceeds the energy level at vehicle 302. In an embodiment, the predicted energy consumption may be a predicted energy consumption for the transport climate control unit 310, and the energy level at vehicle 302 may be based on an energy budget for a transport climate control system prior to comparison to the predicted energy consumption.

The load shedding operation may include one or more of changing a desired climate setpoint of the transport climate control unit 310, changing an operation mode of the transport climate control unit 310, increasing a deadband in the transport climate control unit 310, and utilizing ambient air for climate control.

Changing a desired climate setpoint of the transport climate control unit 310 includes changing the desired temperature to be maintained by transport climate control unit 310, for example to be closer to the ambient temperature of the vehicle. By reducing the difference between the desired climate setpoint and the ambient environment, energy costs for operating the transport climate control unit 310 can be reduced.

The load shedding operation may include changing an operation mode of transport climate control unit 310. The operation mode may be a cooling mode, a heating mode, a defrost mode, a null mode, a dehumidification mode, a reheat mode, or the like. Some modes such as dehumidification or reheat modes may provide optional adjustments to air quality. In one example of load shedding operations, one or more of these optional air quality adjusting operating modes may be deactivated to reduce energy consumption by transport climate control unit 310.

Increasing a deadband of the transport climate control unit 310 can include reducing the cycling of a compressor of transport climate control unit 310. Increasing the deadband can be achieved by, for example, increasing permitted deviations from a desired temperature setpoint for the internal space, introducing delay periods between compressor deactivation and subsequent activation, or the like. For example, the permissible deviation from the desired temperature setpoint may be changed from +/−5 degrees Fahrenheit to +/−10 degrees Fahrenheit.

Using ambient air for climate control may include opening dampers to introduce the ambient air into one or more spaces receiving climate control from transport climate control unit 310, instead of operating the transport climate control unit 310. Use of ambient air for climate control may be based on ambient air conditions such as temperature and humidity.

In an embodiment, the load shedding operation performed at transport climate control system 310 includes increasing an amount of cooling provided to cooler 306. Increasing cooling at cooler 306 may reduce the discharge of batteries under particular conditions. For example, when a battery is above a certain temperature, it may discharge more quickly. The battery temperature may increase when it is under high loads, thus causing extremely rapid discharge. For example, increasing the load at transport climate control system 310 to increase cooling, and directing that cooling to cooler 306 may allow vehicle 302 to maintain desirable battery temperatures even under high loads. The increased cooling at 306 can reduce the discharge of energy storage source 304 during high traction energy usage, for example, climbing hills or frequent starting and stopping.

These load shedding operations may be combined, for example to meet a target reduction in predicted energy consumption while remaining within constraints placed on the extent to which one or more of the load shedding operations may be implemented. The target reduction may be computed by the model predictive control algorithm 314 when comparing the predicted energy consumption to the energy at the vehicle 302. The constraints on the load shedding operations may be included in model predictive control algorithm 314.

Model predictive control algorithm 314 may receive route condition data from an external data source, such as a weather data source 316 and a traffic data source 318. Weather data source 316 may be a source of current and/or forecast weather data such as NOAA. The weather data source 316 may provide data such as current and forecast temperatures, humidity, solar intensity, cloud cover, precipitation and the like. The traffic data source 318 may provide data such as current or forecast traffic levels along a route, average speeds, road congestion, accidents, constructions, detours, delays, and the like. When model predictive control algorithm 314 is located at vehicle 302, data may be received from weather data source 316 and traffic data source 318 via antenna 312.

Model predictive control algorithm 314 may further interface with remote users, manufacturers and/or other systems managing vehicle fleets. In the embodiment shown in FIG. 3, model predictive control algorithm 314 can interface with a climate control provider system 320, a vehicle manufacturer system 322, and an end user system 324. When model predictive control algorithm 314 is located at vehicle 302, data may be exchanged with climate control provider system 320, vehicle manufacturer system 322, and end user system 324 via antenna 312.

Climate control provider system 320 may exchange data with model predictive control algorithm 314. The data may be, for example, data reflective of performance of the transport climate control system 310. The data may be used to refine the model used in model predictive control algorithm 314 or to determine the health of a climate control unit based on its performance versus predictions made by model predictive control algorithm 314.

Vehicle manufacturer system 322 may exchange data with model predictive control algorithm 314. The data may include, for example, data reflecting the performance of a traction system of the vehicle. This data may be used, for example, to refine the model used in model predictive control algorithm 314. The data may be used, for example, to determine the health or performance of the traction system based on its performance versus predictions made by model predictive control algorithm 314. The data may be used, for example, to evaluate the performance of the traction system for particular routes and characteristics of routes such as amount of elevation changes in routes, traffic, etc.

End user system 324 may be, for example, a dispatching, telematics, or other such system used to coordinate operation of a fleet including the vehicle 302. End user system 324 and model predictive control algorithm 314 may exchange data. The data may include, for example, the energy consumption by vehicle 302, consumption of energy during particular routes, and/or other such data of interest to the operators of the fleet including vehicle 302.

Figure 4:
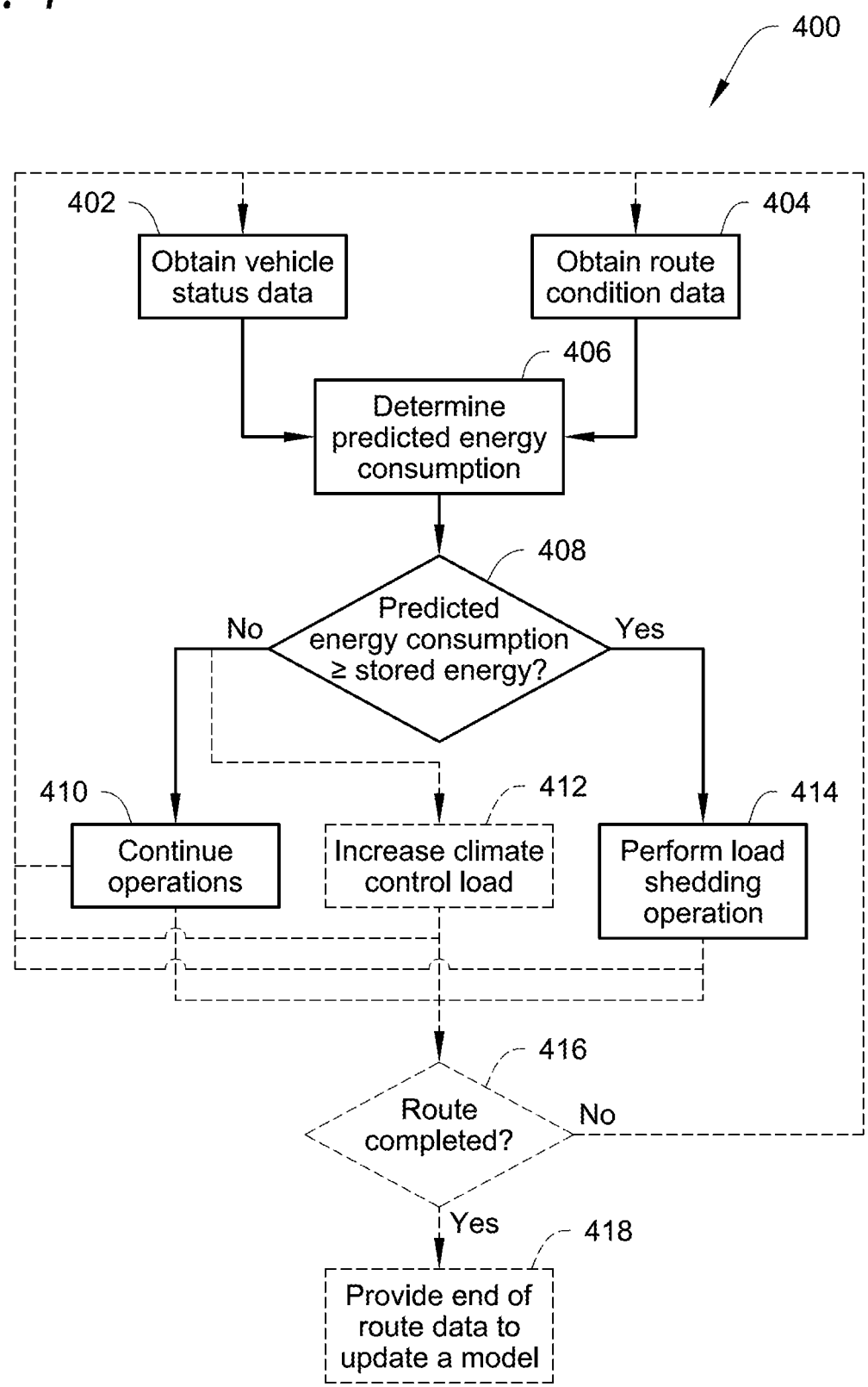
FIG. 4 is a flowchart of a method for energy evaluation and load shedding in a vehicle according to an embodiment.

FIG. 4 is a flowchart of a method 400 for energy evaluation and load shedding in a vehicle, according to an embodiment.

At 402, the method 400 includes obtaining vehicle status data. The vehicle status data is data indicative of conditions at the vehicle that affect energy storage and consumption during a route. The vehicle status data can include, for example, a current stored energy amount, such as the energy level of an energy storage source of the vehicle, e.g. a state of charge of one or more batteries. The vehicle status data may also include, for example, a route assigned to or being traveled by the vehicle, a number of stops and/or door openings along the route, a set point of a transport climate control system, an ambient temperature at the vehicle, a location of the vehicle, a count of passengers on the vehicle, a temperature of the energy storage source of the vehicle, or the like. The vehicle status data may be obtained from one or more sources. The sources of the vehicle status data obtained at 402 may include, for example, a dispatching system, a climate controller such as the climate controller 255 shown in FIG. 2.

Method 400 also includes obtaining route condition data at 404. The route condition data can include data regarding conditions affecting aspects of the route, for example, weather data and traffic data. Weather data may include, for example, current weather data and forecast weather data for temperature, humidity, solar intensity, cloud cover, precipitation, and the like. The sources for weather data may include, for example, a weather forecast provider, such as, for example, NOAA. Traffic data may include, for example, current and forecast data regarding average speed over particular roadways, road congestion, accidents, delays, or the like. The sources for traffic data may include, for example, dispatching systems, mapping services, or the like.

Once the vehicle status data is obtained at 402 and the route condition data is obtained at 404, the method 400 proceeds to determining a predicted energy consumption at 406. The predicted energy consumption determined at 406 may include a predicted traction energy consumption, and/or a predicted transport climate control energy consumption. The predicted energy consumption determined at 406 may further include the predicted energy consumption of one or more accessory loads, such as lights, radio, controls, entertainment systems, navigation systems, and the like. The predicted energy consumption may be determined at 406 using one or more mathematical models, such as lookup tables, predetermined equations, machine learning models, or the like.

The predicted traction energy consumption is an amount of energy required to drive movement of the vehicle, for example powering one or more motors driving the wheels of vehicle to completion of the route. The traction energy consumption may be predicted using a predictive model. The predictive model may be, for example, a lookup table, a machine learning algorithm, or the like. The predictive model may determine the predicted traction energy consumption based on parameters affecting energy consumption during the remaining portion of the route, such as the distance remaining, expected speed, expected numbers of starting and stopping operations, expected changes in elevation, and other such factors affecting the energy required to successfully reach complete the route. In an embodiment, the traction energy consumption is based on a route length, traffic data, and elevation data including changes of elevation along the route.

The predicted transport climate control energy consumption may be determined based on parameters affecting the energy consumption for operating a transport climate control unit. The parameters may include, for example, number and/or duration of door openings, number of passengers, remaining duration of the route, ambient temperature, temperature forecasts, solar intensity, cloud cover, and the like. The predicted transport climate control energy consumption may be determined using a predictive model. The predictive model may be, for example, a lookup table, a mathematical model, a machine learning algorithm, or the like.

The predicted accessory energy consumption may be determined based on, for example, a remaining duration of the route and an average consumption by the accessories. The determination may vary based on the operational characteristics of the accessories, whether their operation is continuous or intermittent, the variability of their power draw, and other such information included into a model of accessory energy consumption.

In an embodiment, the predicted energy consumption determined at 406 may be a sum of the predicted traction energy consumption, the predicted transport climate control energy consumption, and/or a predicted accessory energy consumption.

At 408, the predicted energy consumption determined at 406 is compared to the stored energy amount at the vehicle, included in the vehicle status data obtained at 402.

When the predicted energy consumption from 404 is found to be equal to or less than the stored energy at the vehicle at 408, the method 400 proceeds to 410. When the predicted energy consumption from 404 is found to be greater than the stored energy at the vehicle at 408, the method 400 proceeds to 414. Optionally, in an embodiment, when the predicted energy consumption from 404 is found to be equal to or less than the stored energy at the vehicle at 408, the method 400 can proceed to optional 412 instead of 410, when a predetermined setting allows an operator to increase a load of a transport climate control unit. The method 400 may proceed to 412 when the stored energy is determined to exceed the predicted energy consumption by a predetermined amount. For example, method 400 may proceed to 412 when the difference between the stored energy and the predicted energy consumption is larger than a predetermined threshold value or when the stored energy is a multiple of the predicted energy consumption that exceeds a predetermined value.

At 410, the operations of the vehicle may continue unchanged. The transport climate control system may be operated according to its current settings such as, for example, temperature set point, dead band, operating mode, and the like. The method 400 may proceed from 410 to 402 and 404 to iterate, or method 400 may proceed to optional 416.

At optional 412, the load of the transport climate control system may be increased, for example by changing a set point of the transport climate control system to be further from the ambient temperature. For example, a driver of a vehicle may increase the cooling of a passenger compartment to increase passenger comfort.

At 414, a transport climate control system load shedding operation is performed. The load shedding operation may include one or more of changing a desired climate setpoint of the transport climate control unit, changing an operation mode of the transport climate control unit, increasing a deadband in the transport climate control unit, and utilizing ambient air for climate control. In one embodiment, changing a desired climate setpoint of the transport climate control unit can include changing a desired setpoint temperature to be maintained by the transport climate control unit, for example, to be closer to the ambient temperature outside of the vehicle. This can reduce the energy cost of operating the transport climate control unit for the remaining duration of the route. Following the load shedding operation performed at 414, the method 400 may proceed to optional 416.

The load shedding operation may include changing an operation mode of the transport climate control unit. The operation mode may be a cooling mode, a defrost mode, a null mode, a dehumidification mode, a reheat mode, or the like. Some modes such as dehumidification or reheat modes may provide optional adjustments to air quality. In one example of load shedding operations, one or more of these optional air quality adjusting operating modes may be deactivated to reduce energy consumption by a transport climate control unit.

Increasing a deadband of the transport climate control unit reduces the cycling of a compressor of transport climate control unit, for example by increasing permitted deviations from the set point, introducing delay periods between compressor deactivation and subsequent activation, or the like.

Using ambient air for climate control may include opening one or more dampers to introduce the ambient air into one or more spaces receiving climate control from transport climate control unit instead of operating the transport climate control unit. Use of ambient air for climate control may be based on ambient air conditions such as temperature and humidity.

In an embodiment, the load shedding operation performed at 414 can include increasing an amount of cooling provided to an energy storage source. Increasing cooling at an energy storage source can reduce or prevent excessive discharge that results from high temperatures. These high temperatures may occur at high loading of the energy storage source, such as high traction and/or climate control loads. Providing additional cooling may maintain preferred operating temperatures even during periods of such high loading. The temperatures and loads resulting in increased discharge may be determined based on the properties of the particular battery. The high temperatures may result from one or more of high ambient air temperatures and heat produced by the energy storage source. High loads may include, for example, vehicle weight (for example, due to variation in passenger count or cargo load), geographic conditions (for example, climbing hills), and the like. Increasing the load at the transport climate control system to increase energy storage source cooling may allow a vehicle to reduce the discharge of stored energy during high traction energy usage, for example, while climbing hills or frequent starting and stopping.

At optional 412, a vehicle operator may be given the option to increase the load of a transport climate control system. The optional increased load at 412 may be a change to operations in the transport climate control system that increases energy consumption. For example, the change may be to change a set point of the transport climate control system a based on driver or passenger preferences, or engage optional air conditioning operations such as dehumidification. The option may be presented, for example, as a prompt to the driver indicating that the load may be increased, and a user input selecting a change to the operations of the transport climate control system may be accepted. The transport climate control system may be operated according to the increased load selected by the operator at 412. The method 400 may then proceed to 402 and 404 to iterate again, or method 400 may proceed to optional 416.

Optionally, at 416, it is determined whether or not the route is complete. When the route is determined to not be complete, the method 400 may continue to iterate by returning to 402 and 404. Completion of the route may be determined, for example, based on the location of the vehicle relative to the route, a user input, a deactivation of the vehicle, or the like.

When it is determined at 416 that the route is complete, the method 400 can proceed to optional 418. When it is determined that the route is not complete, the method 400 proceeds back to 402 and 404.

At optional 418, end-of-route data may be provided to update a model at 418, such as model predictive control algorithm 314. The end-of-route data may include the energy consumed during the route, such as starting and ending energy levels. The end-of-route data may further include, for example, an identifier for the route that was completed, conditions during the route such as the weather data, the traffic data, number of stops, number of door openings, passenger data such as average number of passengers or numbers of passengers over time, and the like. The model may be updated by incorporating the end-of-route data into the model, such as feeding the end-of-route data into a machine learning algorithm or the like.

Aspects:

It is understood that any of aspects 1-13 may be combined with any of aspects 14-20.

Aspect 1. A method for shedding climate control loads at a vehicle, comprising:

obtaining vehicle status data indicative of conditions at the vehicle that affect energy storage and consumption during a route, wherein the vehicle status data includes a stored energy amount;

obtaining route condition data indicative of conditions along the route;

determining a predicted energy consumption based on the vehicle status data and the route condition data;

comparing the predicted energy consumption to the stored energy amount; and when the predicted energy consumption exceeds the stored energy amount, performing a load shedding operation at a transport climate control system.

Aspect 2. The method according to aspect 1, wherein determining the predicted energy consumption includes determining a predicted HVAC consumption for the route.

Aspect 3. The method according to aspect 2, wherein the vehicle status data includes the route and the route condition data includes weather data.

Aspect 4. The method according to any of aspects 3, wherein the route for the vehicle includes a number of door openings and a predicted passenger count.

Aspect 5. The method according to any of aspects 1-4, wherein determining the predicted energy consumption includes determining a predicted traction energy consumption for the route.

Aspect 6. The method according to aspect 5, wherein the vehicle status data includes a route for the vehicle and the route condition data includes traffic data and elevation data.

Aspect 7. The method according to any of aspects 1-6, wherein performing the load shedding operation includes changing a desired climate setpoint of the transport climate control system.

Aspect 8. The method according to any of aspects 1-7, wherein performing the load shedding operation includes changing an operation mode of the transport climate control system.

Aspect 9. The method according to any of aspects 1-8, wherein performing the load shedding operation includes increasing a dead band of a compressor included in the transport climate control system.

Aspect 10. The method according to any of aspects 1-9, wherein performing the load shedding operation includes increasing cooling provided to a battery of the vehicle.

Aspect 11. The method according to any of aspects 1-10, further comprising, at completion of the route of the vehicle, providing feedback data including a route identifier and an energy consumption during the route to the processor and updating a model configured to determine the predicted energy consumption based on the feedback data.

Aspect 12. The method according to any of aspects 1-11, further comprising presenting a prompt to a user to accept or reject the load shedding operation and receiving a user input accepting or rejecting the load shedding operation, and wherein the load shedding operation is performed when the user input accepting the load shedding operation is received.

Aspect 13. The method according to any of aspects 1-12, wherein when the predicted energy consumption is less than the stored energy of the vehicle, a load of the transport climate control system is increased.

Aspect 14. A load shedding system of a vehicle, comprising:
an energy storage source;
an energy storage management system, configured to determine a stored energy amount;
a communication link located on the vehicle;
a transport climate control system; and
a processor, configured to:
obtain vehicle status data indicative of conditions at the vehicle that affect energy storage and consumption during a route, the vehicle status data including the stored energy amount;
obtain route condition data indicative of conditions along the route;
determine a predicted energy consumption based on the vehicle status data and the route condition data;
compare the predicted energy consumption to the stored energy of the vehicle; and
when the predicted energy consumption exceeds the stored energy of the vehicle, direct performance of a load shedding operation at the transport climate control system.

Aspect 15. The load shedding system according to aspect 14, wherein the transport climate control system is a vehicle HVAC system.

Aspect 16. The load shedding system according to any of aspects 14-15, wherein the processor is included in a controller located at the vehicle.

Aspect 17. The load shedding system according to any of aspects 14-16, wherein the processor is located remote from the vehicle.

Aspect 18. The load shedding system according to any of aspects 14-17, wherein the energy storage source includes one or more batteries.

Aspect 19. The load shedding system according to any of aspects 14-18, further comprising a door sensor configured to detect a status of a door of a space receiving climate control from the transport climate control system.

Aspect 20. The load shedding system according to any of aspects 14-19, wherein the transport climate control system is configured to provide cooling to the energy storage source.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method for smart load shedding of climate control loads of a transport climate control system that provides climate control to a vehicle, the method comprising:
obtaining vehicle status data indicative of conditions at the vehicle that affect energy storage and consumption during a route, wherein the vehicle status data includes a stored energy amount;
obtaining route condition data indicative of conditions along the route;
determining a predicted energy consumption based on the vehicle status data and the route condition data;
comparing the predicted energy consumption to the stored energy amount; and
when the predicted energy consumption exceeds the stored energy amount, performing a load shedding operation of the climate control loads of the transport climate control system.

2. The method of claim 1, wherein performing the load shedding operation includes changing a desired climate setpoint of the transport climate control system.

3. The method of claim 1, wherein performing the load shedding operation includes changing an operation mode of the transport climate control system.

4. The method of claim 1, wherein performing the load shedding operation includes increasing a dead band of a compressor included in the transport climate control system.

5. The method of claim 1, wherein performing the load shedding operation includes increasing cooling provided to a battery of the vehicle.

6. The method of claim 1, further comprising, at completion of the route of the vehicle, providing feedback data including a route identifier and an energy consumption during the route to the processor and updating a model configured to determine the predicted energy consumption based on the feedback data.

7. The method of claim 1, further comprising presenting a prompt to a user to accept or reject the load shedding operation and receiving a user input accepting or rejecting the load shedding operation, and wherein the load shedding operation is performed when the user input accepting the load shedding operation is received.

8. The method of claim 1, wherein when the predicted energy consumption is less than the stored energy of the vehicle, a load of the transport climate control system is increased.

9. The method of claim 1, wherein determining the predicted energy consumption includes determining a predicted heating, ventilation and air conditioning (HVAC) consumption for the route.

10. The method of claim 9, wherein the vehicle status data includes the route and the route condition data includes weather data.

11. The method of claim 10, wherein the route for the vehicle includes a number of door openings and a predicted passenger count.

12. The method of claim 1, wherein determining the predicted energy consumption includes determining a predicted traction energy consumption for the route.

13. The method of claim 12, wherein the vehicle status data includes a route for the vehicle and the route condition data includes traffic data and elevation data.

14. A load shedding system of a transport climate control system that provides climate control to a vehicle, the system comprising:
   an energy storage source;
   an energy storage management system, configured to determine a stored energy amount of the energy storage source;
   a communication link located on the vehicle;
   a transport climate control system; and
   a processor, configured to:
      obtain vehicle status data indicative of conditions at the vehicle that affect energy storage and consumption during a route, the vehicle status data including the stored energy amount;
      obtain route condition data indicative of conditions along the route;
      determine a predicted energy consumption based on the vehicle status data and the route condition data;
      compare the predicted energy consumption to the stored energy amount; and
      when the predicted energy consumption exceeds the stored energy amount, direct performance of a load shedding operation at the transport climate control system.

15. The load shedding system of claim 14, wherein the transport climate control system is a vehicle HVAC system.

16. The load shedding system of claim 14, wherein the processor is included in a controller located at the vehicle.

17. The load shedding system of claim 14, wherein the processor is located remote from the vehicle.

18. The load shedding system of claim 14, wherein the energy storage source includes one or more batteries.

19. The load shedding system of claim 14, further comprising a door sensor configured to detect a status of a door of a space receiving climate control from the transport climate control system.

20. The load shedding system of claim 14, wherein the transport climate control system is configured to provide cooling to the energy storage source.

* * * * *